Oct. 2, 1934.  T. W. DEMAREST  1,975,138
APPARATUS FOR FLUID PRESSURE REGULATION
Filed June 5, 1923  5 Sheets-Sheet 1

Oct. 2, 1934.    T. W. DEMAREST    1,975,138
APPARATUS FOR FLUID PRESSURE REGULATION
Filed June 5, 1923    5 Sheets-Sheet 5

Patented Oct. 2, 1934

1,975,138

UNITED STATES PATENT OFFICE 1,975,138

APPARATUS FOR FLUID PRESSURE REGULATION

Thomas W. Demarest, Chicago, Ill., assignor to Barco Manufacturing Company, Chicago, Ill., a corporation of Illinois Application June 5, 1923, Serial No. 643,571

33 Claims. (Cl. 121—143)

My present invention relates in general to power plants and their operation, and more particularly to structures employing fluid under pressure as a source of power, and methods of operating the same, and has special reference to the provision of an arrangement permitting the use of steam under higher pressures than have heretofore been found practicable.

For purpose of disclosure of the practical utility and utilization of my invention, I shall proceed to describe it in connection with a convenient adaptation to a railway locomotive engine, and certain pressures arbitrarily selected for purposes of illustration, though it is to be understood that it has a general application in steam engineering practice.

Among the more important objects of my invention, therefore, are the provision of improved forms of throttle mechanism, and of automatically operating throttle mechanism, and of operating controlling and regulating mechanism therefor; the provision of throttle mechanism adapted for alternate manual and automatic operation, or both; the provision of means for automatically maintaining uniform steam pressure at any predetermined point of admission valve cut-off; the provision of means for automatically varying the steam pressure as the point of cut-off is varied; the provision of means for automatically increasing the steam pressure as the cut-off is made earlier; the provision of means for automatically decreasing the steam pressure as the cut-off is made later; the provision of means for automatically increasing the steam pressure as the cut-off is made earlier, in such a manner as to permit the use of relatively shorter travel of the valve, that is, shorter admission valve travel, with decreased admission port openings and consequent decrease of volume of steam admitted and thereby more economical use of steam due to reduction in fuel consumption ensuant upon decrease in the amount of water evaporated; the provision of improved means for controlling the operation of a steam locomotive so as to permit the use of higher steam pressures and smaller cylinders; the provision of an improved system of fluid pressure regulation permitting manual control thereof within certain pressure limits and semi-automatic operation under other pressure conditions; the provision of a system of fluid pressure regulation characterized by the provision of means for the prevention of manual admission of fluids under higher than a predetermined pressure; the provision of such a system characterized by the provision of means for automatically reducing the pressure admitted under other than pre-determined conditions; wherein the variation of the steam pressure admitted to the cylinders in accordance with the cut-off is automatically accomplished proportionately to the cut-off and without manual operation by the engineman other than by the setting of the reverse lever and throttle; the provision of such a system wherein the variation may be graduated or effected step-by-step; the provision of such a system characterized by an association thereof with the customary manual operative devices permitting the free operation of the latter in the case of emergency without interference therewith by the automatically operating devices; the provision generally of such a system characterized by the utilization of fluid under pressure for its operation, and more particularly one wherein the pressure of such fluid is constant; the provision of a system of the character referred to wherein the mechanism utilized is auxiliary to existing mechanism and may be applied to existing structures substantially without substitution therefor or change therein; the provision of improved forms of controlling valves; the provision of an improved form of valve for regulating the fluid pressures subject to control by a spring or other resilient means; the provision of an improved form of pressure relief valve; together with such further and additional objects and advantages as may herein elsewhere appear, or be particularly pointed out.

In carrying out my invention, I have therefore embodied it in one of its aspects in a structure which is illustrated in the accompanying drawings, in which—

Fig. 3a is a horizontal sectional view of a valve;

From the description now to follow, it will be noted that the apparatus employed by me involves in general, in the present form, (A) the engineman's operating valve, (B) the throttle valve actuating mechanism arranged to move the steam throttle, (C) the throttle controlling valve for controlling the feed and thereby the operation of the throttle valve actuating mechanism, B, and (D) the throttle regulator for regulating the operation of the throttle controlling valve C, in addition to the usual throttle valve and its operating mechanism, reversing gear mechanism, E, and valve gear, E'.

Figures 1, 2:
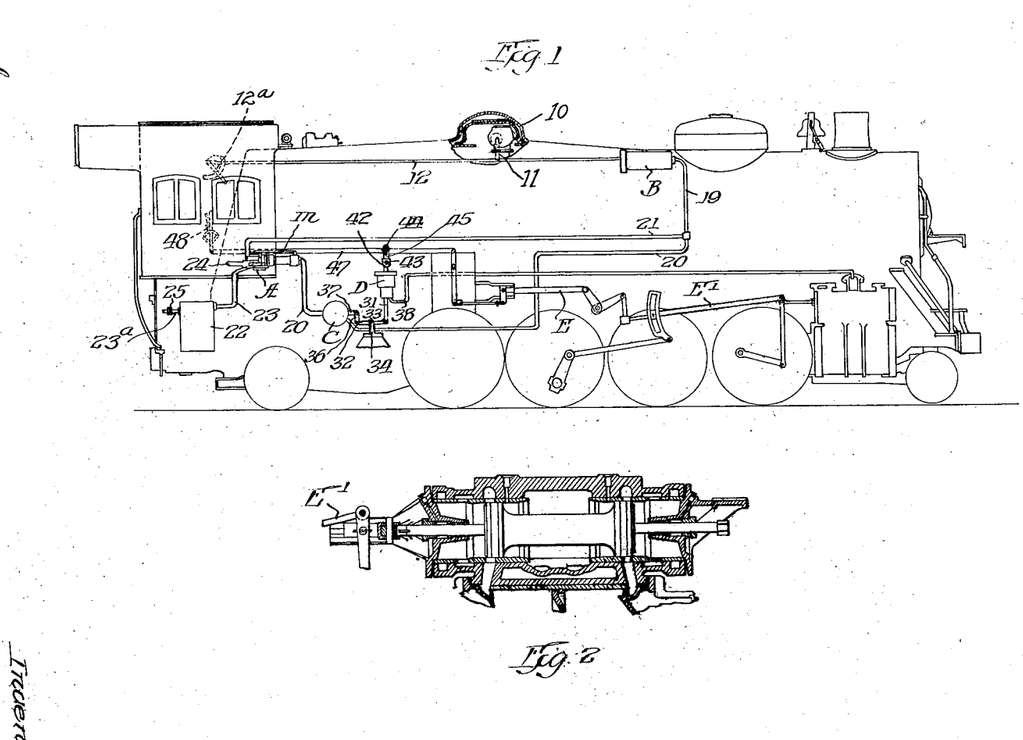
Figure 1 is a side elevational view of a railway locomotive in which a structure embodying my invention is shown somewhat schematically.
Figure 2 is a vertical sectional elevational view illustrative of the steam cylinder and associated admission valve mechanism.

On reference to Figure 1, it will be observed that I have indicated the customary steam dome 10 containing the stand pipe, having the customary throttle valve manually operable through a throttle valve arm 11 which is connected by means of a throttle rod 12 to the customary throttle lever shown in dotted lines at 12a, which throttle rod 12 and its operating lever may in the present case be termed the emergency throttle mechanism, since it will not ordinarily be operated manually save in the unforeseen event of the failure in service of some essential feature of the automatically operating structure presently to be described, such for example as of the supply of compressed air utilized in the operation of the various mechanisms.

The throttle arm 11 is also arranged for fluid pressure operation. This is accomplished by means, indicated generally at B which I may refer to herein as the throttle valve actuating mechanism. In this mechanism, in the form shown, the throttle arm 11 is connected thereto operatively by means of a piston rod 14 to a piston 15 arranged in a cylinder 16. For a purpose to be hereinafter pointed out a spring 17 is arranged between the piston 15 and the cylinder head 18 to operate the rod 14 and close the throttle upon a predetermined reduction of pressure in the cylinder 16. For moving the piston 15 in the opposite direction and against the pressure of the spring 17, fluid under pressure is admitted to the cylinder 16 by means of conduit pipes 19 and 20, and is exhausted therefrom through said pipes 19 and 20 under certain circumstances, and through said pipe 19 and a connecting pipe 21 under other circumstances, as will hereinafter appear.

The structure B just described is connected to and operable by fluid under pressure which may conveniently be air from a reservoir 22 which is supplied from the main air reservoir and is connected by a pipe 23 to a manually operated valve, indicated generally at A, having a handle 24, a pressure regulating valve 25 (designed to supply air under a constant and uniform pressure) being interposed, as in the pipe 23a, between the main air reservoir (not shown) and the auxiliary reservoir 22.

Considering first the manual control of fluid pressure admitted to the throttle actuating mechanism B: The operating valve A is designed to afford manual control by the engineman of the amount of openings corresponding to a predetermined fluid (steam) pressure, (say from zero to a maximum of two hundred pounds per square inch,) in the dry-pipe or cylinders, which results are attained by variation of the fluid (air) pressure in the pipes 19 and 20.

This variation may be accomplished by maintaining any constant amount of fluid (air) pressure, up to say 50 pounds depending on the strength of the spring 17, in the chamber of the cylinder 16 of the throttle actuating device B. The manual feed may be effected through a feed controlling valve C hereinafter described, which remains open to the pipe line 20 (and closed to the atmosphere) until such maximum steam pressure (say two hundred pounds) is reached.

The operating valve A is also adapted to permit modulation of the working pressures admitted to the cylinders, as well as complete closing off of the pressure therefrom, without changing the setting of the reverse-lever or variation of the point of cut-off of the valve motion.

That is to say, the valve A can be adjusted in desired positions to control supply of air under pressure to the cylinder 16 of actuating device B without at the same time adjusting the reverse gear when working steam pressures from zero to two hundred pounds per square inch.

In the form of engineman's operating valve illustrated in the accompanying drawings, and as seen in detail in Figures 4 to 9 inclusive it will be observed that the casing $a$ of the valve A is shown as connected by pipe 23 to the reservoir 22, and by the pipe 20 to the controlling valve C herein elsewhere discussed.

Figures 3, 4, 7:
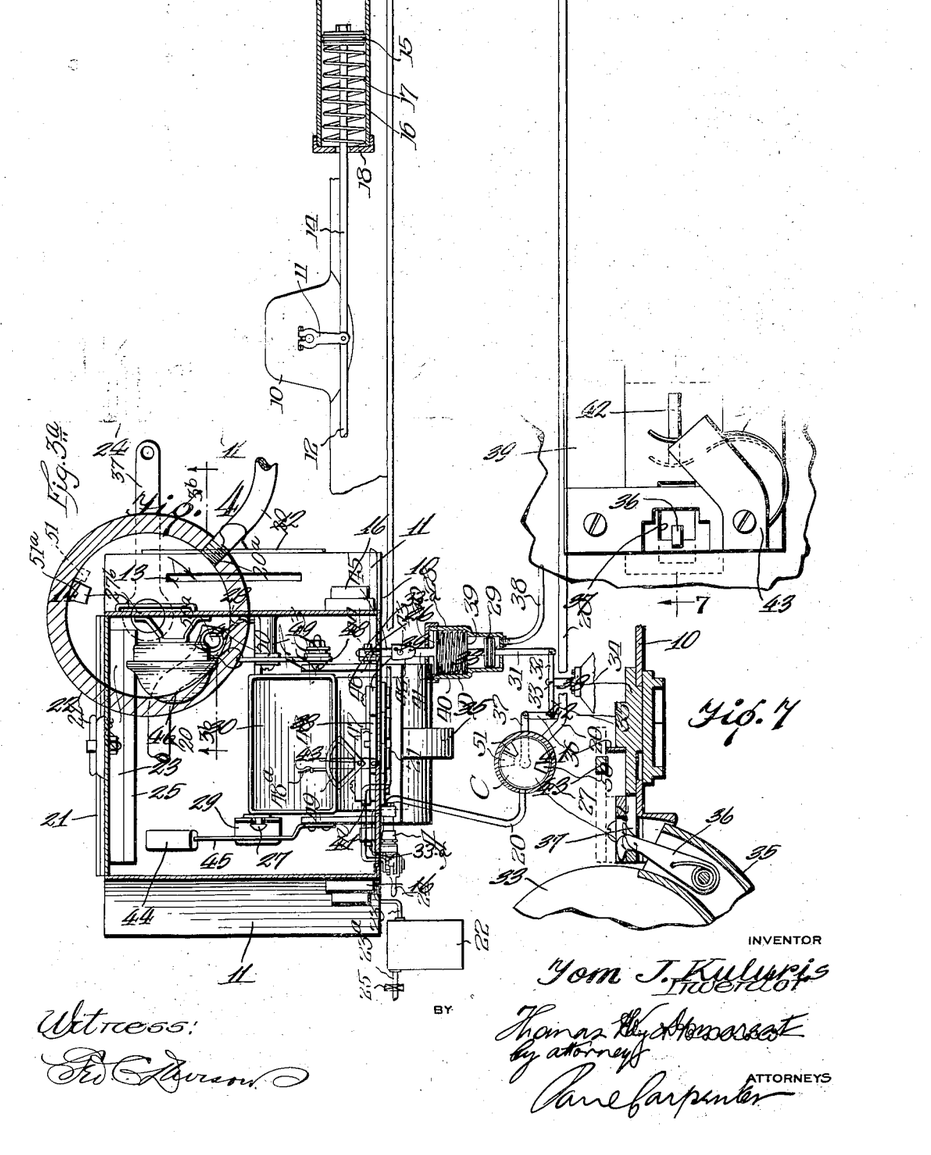
Figure 3 is an enlarged fragmentary and partly sectionalized view illustrative of certain of the elements of Figure 1 on an enlarged scale.
Figure 4 is an enlarged elevational view, partly in section of an improved pressure regulating valve which is employed in this invention.
Figure 7 is a fragmentary vertical sectional view taken on the line 7—7 of Figure 6, looking in the direction indicated by the arrows.
Figure 4:
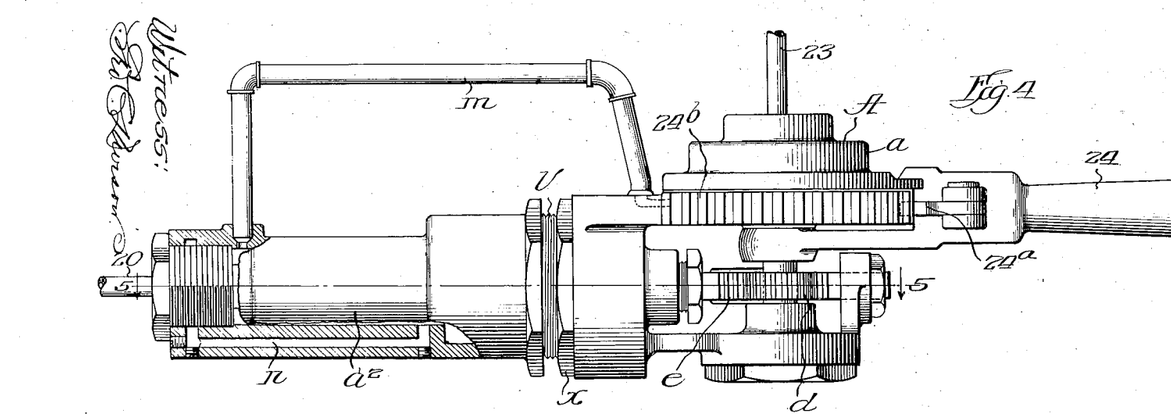
Figure 5:
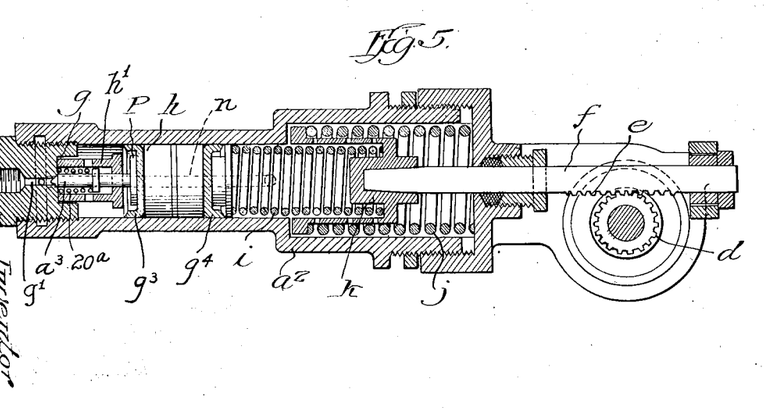
Figure 5 is a longitudinal sectional view taken on the plane of line 5—5 of Figure 4, looking in the direction indicated by the arrows.

In this form of construction so shown, the controlling valve A is provided with a rotating disc $b$ operable by means of a handle 24 having a latch 24a engaging in notches in a quadrant 24b, the latch 24a being operable by a lever 24c spring pressed as indicated at 24d. On the stem $c$ of the disc valve there is arranged a pinion $d$ which meshes with rack teeth, $e$ on and thereby operates a plunger $f$ arranged in an extension $a^2$ of the casing $a$ of the valve A. Within said extension $a^2$ there is also arranged a valve seat member $g$.

The valve seat member is provided with a fixed guide member $h'$ and a needle valve $a^3$ is slidable to the left as seen in Figure 5 against the tension of the spring 20a, when said valve $a^3$ is actuated by the piston member $h$ through contact with the plate P, thus controlling efflux of fluid under pressure to the pipe 20. Suitable packings $g^3$ and $g^4$ are provided for the piston $h$.

Figures 6, 7, 8, 9:
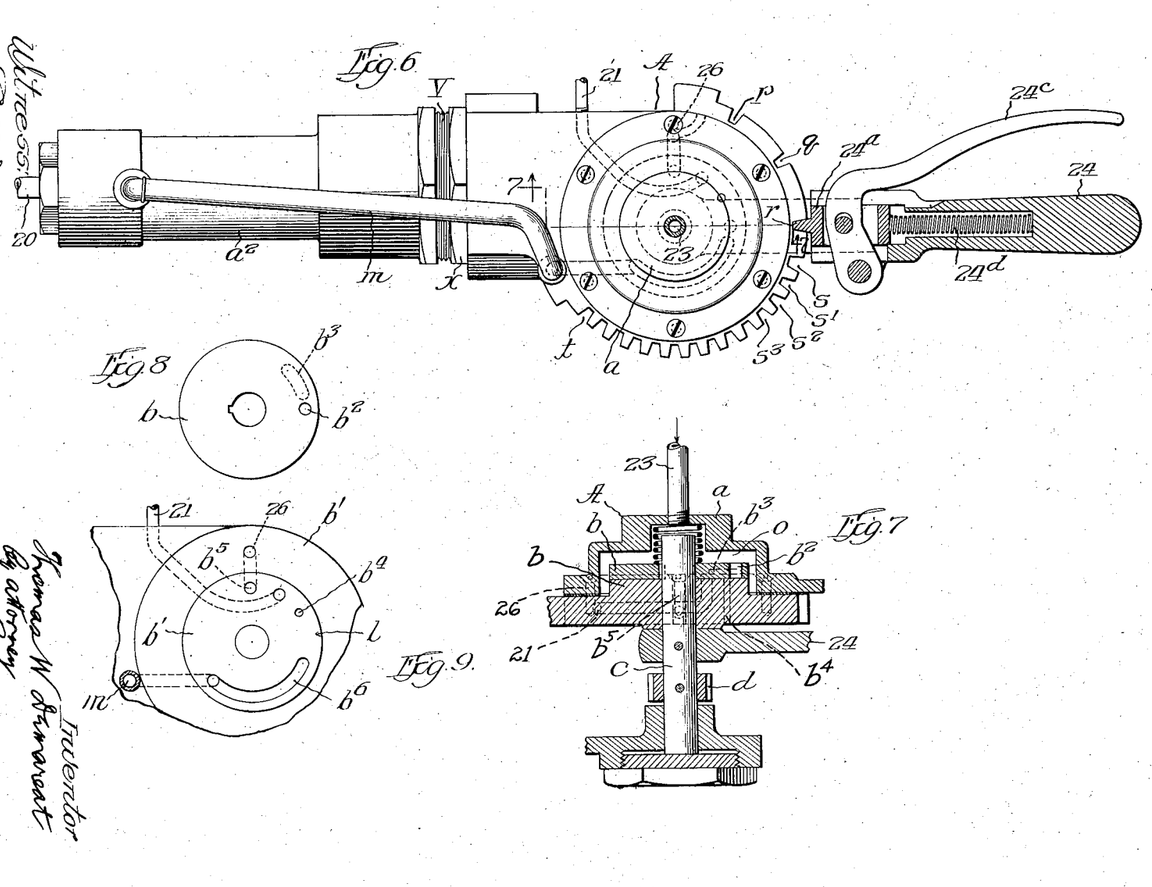
Figure 6 is a top plan view of the valve of Figure 4.
Figures 8 and 9 are plan views of the disk valve and its seat, respectively, forming parts of the device of Figure 7.

Between the plunger $f$ and the piston $h$ there is arranged a yieldingly resistant device which includes the spring $i$, the auxiliary spring $j$, and spring holder $k$ carried by and operable upon movement of the plunger $f$. Inasmuch as the function of the engineman's operating valve A is to afford means for the graduated supply and maintenance of air pressure to the throttle valve operating cylinder B, and depending upon the amount of pressure so furnished to increase or decrease the opening of the throttle valve, the valve disc $b$ is subject to constant pressure impressed by fluid (air) coming through the pipe 23 from the reservoir 22 into the chamber $o$ and has an inlet port $b^2$ adapted to register with a groove $b^6$ in the valve seat $b'$ which affords an air-feed connection to the system as shortly to be described; the valve disc $b$ also has on its under side a groove $b^3$ for connecting the pipe 21, alternately, with either the preliminary exhaust port $b^4$ or with the full exhaust port $b^5$ both in the valve seat $b'$ and which communicate respectively with the atmospheric exhaust ports 26 and 26a;

there is an air feed connection from the groove $b^6$ in the disc valve seat $b'$ by means of a pipe $m$ discharging between one side of the plate P and the valve seat $g$ of said piston $h$, and also there is a bleed or pressure balancing passage as indicated at $n$ between the opposite spring pressed side of the piston $h$ and a point beyond the valve seat thereof, and the quadrant $24b$ has notches corresponding to the following operative positions of the valve disc $b$, viz; $p$—full exhaust, $q$—preliminary exhaust, $r$—lap, $s$, $s^1$, $s^2$,—such predetermined number as may be desired for graduated and progressive fluid pressure admission, the number here shown being fourteen each with a fluid pressure of approximately three and one-half pounds in the pipe system, the final one,—$t$ indicating full admission position.

It will be understood that in the lap position, $r$, the valve is closed off in all of its aspects, the port $b^2$ being at $l$ in Figure 9 and that then the operating fluid, (air) for the throttle actuating mechanism B, may be admitted with graduated pressure into the pipe 20 by moving the handle 24 clockwise through the several notches $s$, $s^1$, $s^2$, et seq.; that on moving the handle 24 counter-clockwise to lap position $r$, predetermined throttle operating pressure is maintained; in so far as it is manually controllable; that by movement of the handle 24 to and from the preliminary exhaust position $q$, such pressure may be decreased gradually, thus partly closing the throttle when, if and as desired; and that by movement of the handle 24 to full exhaust position $p$ a rapid vent to the atmosphere may be effected, and the throttle thereby closed abruptly.

In the neutral or non-operating position of the valve structure A fluid pressure from the reservoir 22 is in the chamber $b^2$ of the valve disc $b$, but the valve disc $b$ is at full exhaust position, the springs $i$ and $j$ are under equal compression and there is no operating fluid pressure at any point in the pipe system, that is, between the operating valve A and the throttle actuating cylinder B.

Assuming that it is desired to carry air pressure not to exceed a maximum of, say, fifty pounds per square inch on the pipe system for operating the throttle actuating mechanism B; the springs $i$ and $j$ are set for a maximum compression at fifty pounds by rotation of the extension $a^2$ of the body A relatively to the main body A, which variation may be accomplished by virtue of the threaded connection indicated at V, the setting being preserved by means of a lock nut $x$, and the pressure regulating valve 25 being similarly set to afford a like fluid pressure of fifty pounds per square inch.

The pipe $m$ enters at one end, and the adjustment of cylinder $a^2$, springs, etc. is, of course, made while the engine is in the shop where a flexible conduit may be employed for testing, whereupon the pipe M is installed.

Then if this full fifty pound pressure be admitted to the valve side of the piston $h$, the piston, of course, remains stationary, since it is balanced by the springs $i$, $j$, and no air passes it, but if at the same time the springs $i$ be weakened, say three and one-half pounds, through the retraction of the plunger $f$ by means of the pinion $d$, then the piston $h$ moves, valve $a^3$ opens and air passes through the pipe $m$ and passage $g^1$ into the system and until three and one-half pounds of air pressure be built up throughout. Thereupon, when through the balancing passage $n$ pressure is built up on the spring side of the piston $h$, such piston moves to close the passage $g^1$ which remains closed until another movement of the plunger $f$ (or loss of pressure through leakage or otherwise in the pipe system) again unbalances the piston valve $h$, when it again lifts, then the pressure is again restored, and finally the piston valve $h$ again closes. These successive movements may be repeatedly iterated as desired; similarly any desired pressure may be instantaneously impressed upon the throttle actuating mechanism B, by a single movement of the handle 24 to a position, e. g., $s^3$, where by means of a proportionate weakening of the spring $i$, a higher pressure, say twenty-five pounds, for example, may be admitted at once to the pipe system, and a corresponding throttle opening accomplished.

In this manual procedure, not only may any desired amount of air (up to the predetermined maximum pressure) be admitted instantly or by graduated movements into and maintained in the piping system, and thereby in the throttle actuating mechanism B, and so the throttle may be opened manually to the desired degree permitted by the regulator D herein elsewhere discussed, but the throttle may be held in such position since movement of the handle 24 to lap position $r$, inasmuch as it compresses the spring $j$ and holds the piston valve $h$ against the seat $g$ having the passage $g^1$ leading to the pipe 20. Conversely, such pressure may be reduced, and the throttle valve closed to such an extent as desired, by manipulating the handle 24 relatively to the preliminary exhaust position $q$ in the quadrant, so as to cause and interrupt registration of the preliminary exhaust port with the atmosphere.

Thus, the operating valve A not only has manual communication with the throttle valve actuating mechanism B through the pipes 19 and 20 whereby the said actuating mechanism may be manually opened step by step, or by a single movement, but is provided with pipes 19 and 21 through the medium of which fluid pressure from said actuating mechanism B may be variably vented or completely exhausted to the atmosphere manually when the operating handle 24 of the valve A is turned to one of the release positions.

Considering now the means for the automatic control and regulation of fluid pressures admitted to the throttle valve actuating mechanism B, it is to be noted that in the pipe line 19, 20 connecting the operating valve A with the said actuating mechanism B, there is interposed between said elements A and B, a feed controlling device in the form of a valve C. The valve C serves in one position to have no effect on flow from valve A to throttle operating mechanism B, but in another position valve C serves to bleed the line 20 and thus reduce pressure therein. In yet another position the valve C cuts off pressure from valve A, and still bleeds air out of the mechanism B. Accordingly the valve C may herein be termed the throttle control valve.

The throttle controlling valve C is automatically regulated in its action by means of a regulator D (herein elsewhere discussed) which is interposed between said valve C and the operating lever of the valve gear or of the reversing mechanism.

By this arrangement the throttle controlling valve C is differentially subjected to variation in its action by variation in the position of said operating lever, and to variation in its action by variation in the fluid pressure in the dry-pipe or the cylinders, as herein elsewhere described. In the embodiment of my invention shown in the accompanying drawings, I have employed a reversing gear mechanism indicated generally at E, to which is coupled a valve motion indicated generally at E' in a customary manner.

The throttle controlling valve C is shown in normal open position permitting flow of air or other fluid to the device B.

Referring to the regulator D shown in Figure 3 it will be noted that within the casing 28 thereof there are arranged two pistons 29 and 30. The piston 29 is connected to and arranged to operate a piston rod 31, whose lower or outer end is mounted on one end 32 of a rocking lever pivotally supported (as indicated at 33) on a bracket 34. The opposite end 35 of said rocking lever is connected by a link 36 to the operating lever 37 of the throttle controlling valve C. The casing 28 of the regulator D is connected below the piston 29 by a pipe 38 to the throttled side of the dry-pipe.

Above the piston 29, the body 28 of the regulator D is enlarged for the reception of a plate 39 also mounted on and preferably secured to the piston rod 31, at which plate the rod 31 terminates. A spring 40 is interposed between said plate 39 and the piston 30 and is adapted to move the piston rod 31, upon reduction of pressure against the piston 29, and conversely to oppose movement of the piston in the opposite direction as herein elsewhere set forth. The piston 30 is provided with a stem 41. Against the terminal of the stem 41 there is arranged to bear a cam 42, pivoted at 43, and having an arm 45 slotted as indicated at 44 for the reception of a stud 46, whereby said cam is operably connected to the reach rod 47 of the reversing gear mechanism E, or valve motion E', or movement to and fro, for applying or relieving pressure of the plate 30 upon the spring 40. The rod 47 is manually operated by means of the customary lever 48 associated with the quadrant 49. This lever 48 though termed the reverse lever, both generally and herein especially, also controls the cut-off of the valve motion E', and is connected thereto.

Considering the functions of the four elements A, B, C, D in order, it is to be observed that—

The operating valve A is designed to permit manual control of the throttle mechanism when operating the locomotive on steam pressures from zero to say two hundred pounds per square inch so that the valve A can be manipulated to actuate mechanism B to admit steam to the cylinders in any desired amount and pressure up to a predetermined low pressure maximum.

In this connection, it is to be observed that the reverse lever 48 with its latch 48a and quadrant 49 (quite customary in steam locomotives at this day) enables the engineer to set the reversing gear and associated valve gear mechanism in such a way as to cause the locomotive engine to move forwardly or backwardly as desired, as is usual. As the reversing gear and valve gear mechanisms may be of any one of a number of well known types, such as that of Walschaert, for example, no particular type being essential to the adequate and proper operation of controlling systems embodying my present invention, I have refrained from complicating the drawings and this specification by the detailed illustration and particularized description of these elements which in species are non-essential.

As has been suggested above, the reach rod 47 of the reversing gear mechanism E or valve gear E' is operatively connected with the throttle regulator D, and thence with the throttle control valve C. As the reverse lever is moved toward a center position from either forward or reverse position, that is, latched up, the maximum boiler pressure available may be employed. For example, if the maximum boiler pressure is 500 pounds per square inch, this pressure can be applied by the throttle to the cylinders only when the valve gear is in proper position.

Unless the reverse lever is thus substantially in the central position, the spring 40 will not be sufficiently compressed to hold the piston 29 against upward movement and consequent bleeding of pressure from the pipe 20.

It will be understood that the purpose of the control of steam pressure with respect to cut-off is to accomplish the economy in operation desired with higher steam pressures, that is, at starting the locomotive the full stroke of the valve gear may be employed so as to obtain the desired starting torque.

The operating valve through its control of mechanism B permits the engineman to actuate mechanism B to increase steam pressures from zero to say 200 pounds per square inch without necessity of changing position of reverse lever.

In the form of the valve C shown in Figures 1, 3a and 3b, the valve member is contained in a housing 27 substantially circular in form and having a disk valve member 27a arranged for rotation therein. This valve member 27a is provided with an axial stud 27b which projects through the bottom of the housing 27 and is fixedly connected to the hub of the lever 37.

The disk valve member 27a is additionally provided with what may be termed an admission port which is in the form of a notch 50 and an exhaust port 51a of the same nature as the admission port 50. The pipe 20 is interrupted by the valve casing 27, one portion 20a of said pipe entering the circumferential wall of the casing at any convenient point above the disc valve 27a, which may be as shown in Figures 1, 3a and 3b, and the pipe 20 continuing from the bottom of the casing, 27, as indicated at 50a. When the valve is in one position the admission port 50 is in communication with the inlet opening 50a of the pipe 20, and in another position of the valve member 27a this inlet opening 50a is closed by the body of the disk valve member.

An exhaust port 51 is provided in the bottom of the housing 27, and when the valve member 27a is rotated in the direction of the arrow X, Figure 3a, air will be exhausted from the pipe 20, that is, the portion of the pipe extending from the casing 27 to the throttle operating cylinder and piston through the partial registration of the openings 51a and 51. This movement of the valve also tends to close the opening 50a and on an occasion when an improper setting of a reverse lever takes place, and steam pressure in the cylinders moves the piston 29 against the tension of the spring 40, the inlet opening 50a will be completely closed and the exhaust inlet 51a brought into substantial registration with the exhaust port 51, and thus completely exhaust pressure from the pipe 20 or exhaust pressure until the throttle has closed to that degree of opening commensurate with the setting of the reverse lever to obtain economic operation. It will thus be seen that the valve C acts, as it were, as a floating control on the steam pressure admitted to the cylinders, and is automatic in its operation in preventing the manual or voluntary admission of steam to the cylinders beyond that which will produce economic operation with the proper setting of the valve gear. In other words, the valve C modifies the engineman's acts of operation of the valve A in that, should the engineman admit more air pressure to open the throttle wider than he should with the particular setting of the valve gear, the throttle will not so open permanently but immediately upon increase of pressures against the piston 29 beyond that established by the spring 40 the valve C will commence to throttle the pipe 20 and either entirely exhaust the same to atmosphere, or partially exhaust the same, at the same time cutting down the supply of fluid under pressure from the valve A.

In the form of throttle regulator D shown, it will be observed that the piston rod 31 (and thence to lever 37 of the controlling valve C) is subjected to the balanced action both of variable fluid pressure applied to one side of the piston 29 and introduced through the pipe 38 from the throttled side of the dry-pipe, and of the variable pressure of the spring 40 interposed between the opposite side of the plate 39 and the piston 30.

During automatic operation, the tension of the spring 40 may become preponderant as against fluid under pressure exerted upon piston 29, thus preventing movement of said piston to actuate the valve to "closed" position, that is, to shut off air from the valve A and release air from pipe 20. The tension of spring 40 is, of course, increased when the reverse lever is latched up. On the other hand, if the lever is not sufficiently latched up by the engineman, then the steam pressure in pipe 38 will overcome the tension of the spring 40 and act to move the valve C to position to partially open to atmosphere through port 51 and partially shut off air entering through port 50a which partially shuts off air from valve A or completely do so. A complete exhaust of air from pipe 20 would, of course, result in a complete shutting of throttle which would occur if the engineman were grossly negligent in the proper positioning of the reverse lever. Consequently it is clear that the position of the reverse lever 48 relatively to the quadrant 49, and thence of the reach rod 47, controls the pressure on the yieldingly resistant spring 40, which pressure in turn is transmitted through the plate 39 to the piston rod 31 and thence through the rocking lever 32—33 and the link 36 to the operating lever 37 of the controlling valve C. On the opposite side, that is, under the piston 29, as there is fluid pressure substantially that of the dry-pipe, when and if such pressure rises to a point above that co-ordinate with and determined by the position of the reverse lever 48, the piston 29 rises and in so doing moves the valve C to cause the ports 51a and 51 more or less to register, which permits the automatic partial or complete exhaust of pressure in the conduit 20, thus in turn causing the operation of the throttle valve actuating mechanism B, by the spring 17 with consequent proportional shutting down of the throttle.

This is accomplished automatically, since in the form of throttle valve actuating mechanism B shown, where I employ a cylinder 16 in which the piston 15 is connected to the throttle arm 11 by means of the rod 14, the said piston 15 is subjected on one side to a fluid pressure for a desired condition of operation coming from the air reservoir 22 through the operating valve A, operated, controlled and regulated as above described, and on the opposite side to the pressure of the spring 17 interposed between the piston 15 and the cylinder head 18, which spring is of a strength sufficient to move the throttle arm 11 upon reduction of pressure in the cylinder 16.

It is to be remembered that the fluid pressure to which the piston 15 is subjected is uniform as well as constant, subject to two variable factors, the one, automatic regulation by the regulator D through the controlling valve C, and the other manual variation within predetermined limits through manipulation of the handle 24 of the operating valve A at will by the engineman. In view of the construction, function, and operation of said operating valve A and the divers settings that may be given thereto the engineman is enabled to open and close the throttle valve, to move it to any desired position (save as to limited) and generally manipulate it as fully as though it were directly under his hand as through the medium of the operating rod 12, as herein elsewhere pointed out in connection with said operating valve A and the details thereof.

From the foregoing, it will be understood that while the admission port 50 of the valve C is normally open and held in open position to the extent permitted by the position of the reverse lever, it being understood that the valve member 27a moves automatically, the steam pressure established in the dry pipe when acting on the valve 27a through the pipe 38 by increasing any such steam pressures beyond the predetermined amount will function to move the valve 27a to partially or entirely exhaust pressure in the pipe 20. That is, as the admission port 50 is gradually shut off by the valve 27a, the exhaust port 51 opens to atmosphere through the recess 51a. A reduction of air pressure in the pipe 20 thus takes place which will permit the piston 15 to close the throttle partially or entirely, depending on the amount of pressure reduction in the pipe 20.

When, however, it is desired to close the throttle in the ordinary operation of the engine, the handle 24 of the valve A is thrown to the full release position causing the pipe 21 to register with the exhaust port 26, thus venting the pipe 21 to the atmosphere, thereby exhausting the cylinder 16 of the mechanism B and permitting the spring 17 thereof to move the rod 14 and close the throttle valve.

In light of the preceding considerations, and in view of the facts that neither the reach rod 47 nor the throttle rod 14 are mechanically connected to any structural elements of substantial resistance to manual operation, it will be obvious that the event of operative failure (for example that of air supply from the reservoir 22) will not render inoperative a locomotive equipped with a controlling system embodying my present invention, since in any emergency the throttle arm 11 may be operated manually through the rod 12 in the usual manner, and since the reversing gear mechanism E and associated valve gear mechanism E' may likewise be operated in the usual manner by means of the reverse lever 48.

From the foregoing description of the mechanisms employed by me, their structures, functions and methods of operation, and particularly in view of the fact that the piston rod 31 of the throttle regulating valve device 28 is, as it were, balanced between fluid pressure against one side of the piston 29 and mechanical pressure on the opposite side of the plate 39, which vary according to the pressure of the steam coming from the dry-pipe, on the one hand, and the degree of pressure exerted on the spring 40 according to the position of the reverse lever 48 on the other hand, it will be manifest that the range of steam pressures subject to the hand control or regulation of the engineman through the manipulation of the handle 24 of the operating valve A may be varied by variation in the strength of the spring 40 which by regulation or substitution may be made of greater or less yielding resistance as desired.

It is to be noted that the strength of the spring 40 and its consequent resistance to pressure is of critical importance, since when the reverse lever 48 is in a position of no cut-off such as at starting or on a heavy grade the spring 40 must permit the utilization of pressures up to the pre-determined maximum for manual operation (say two hundred pounds per square inch) before moving the lever 37 thereby causing the exhaust ports 51a and 51 of valve C to register and so exhausting the line 20 and thereby closing the throttle. Equally, the spring 40 must offer the precise amount of resistance required when the reverse lever 48 is moved to its central position (that is, the common extreme forward or extreme reverse position shown) for balancing the high pressure admitted against the piston 29 through the pipe 38 from the dry-pipe, and also offer the required resistance to variation in the pressures as may come from the dry-pipe as the reverse lever is progressively moved from its point of no cut-off to that of its maximum or full allowable cut-off such as is done during acceleration, or held in lap or running position at any intermediate point.

It is to be emphasized that in the present invention under normal operation, that is, with all of the parts properly coordinated and properly operating, the engineman has complete manual control of the steam pressure in the cylinders, both by means of the throttle, that is, through the valve A and its associated mechanism B, and the reverse lever up to a predetermined steam pressure, whereupon reaching such pressure, say 200 pounds per square inch, with say 500 or 700 pounds available, the control of the cylinder or dry pipe pressure cannot be increased by the engineman solely by means of the valve A and mechanism B, but is effective only by proper manipulation of the reverse lever, that is, by the cut-off or valve stroke in accordance with the demands of the running conditions. For instance, after a fairly high speed has been reached, to increase that speed the engineman must latch up, that is, move the reverse lever back toward its central position, which results, through the instrumentalities hereinbefore described, in an increase of the pressure over 200 pounds to the amount sufficient with the earlier cut-off to maintain the speed. The engineman may, of course, decrease the pressure or shut off completely at any time by means of the valve A, but in the operation beyond 200 pounds, the engineman leaves the valve A in such position that the maximum air pressure of 50 pounds is available subject to control by the valve C for moving the piston to its maximum open throttle position if necessary.

In the operation, for example, assume that the valve A is operated to start the locomotive with the lever 48 in the forward position for latest cut-off. After the locomotive has reached a pre-determined speed, it is common practice for the engineman to latch up with the reverse lever.

When operating on pressures above 200 pounds per square inch, the full 50 pounds air pressure is available subject to control by the valve C so that the piston 15 may be forced far enough over to the left to open the throttle valve so as to render the 500 pounds or more pressure available at the cylinders. This pressure is available and regulated by the position of the reverse lever, the engineman employing the reverse lever for increasing or decreasing the stroke of the engine valves so as to obtain the most desirable results from the use of the high pressure. It is understood that as the reverse lever is brought back toward the neutral position when operating under the high pressure, this high pressure acts on the piston 29 to oppose the spring 40 which is thus increased in tension by the manipulation of the reverse lever. In view of the fact that the pressure increases behind the piston 29 substantially proportionally with the increase in the tension of the spring 40, it is obvious that the valve C will remain stationary and thus the required air pressure will continue on the piston 15, thus keeping the 500 pounds steam pressure available subject to control by the cut-off so that when the engine is operating at a higher rate of speed, this rate of speed may be maintained by a relatively low amount of steam because the steam possesses more kinetic energy at the piston due to its above ordinary steam pressure. It will thus be seen that under ordinary manual controlled conditions the engineman can, by means of the throttle valve A, control the steam pressure per se but in order that the higher pressures may be rendered available, he must permit the piston 15 to be moved as far over as it will go to feed steam beyond 200 pounds pressure. Of course, indirectly by means of the reverse lever, the engineman does control the 500 pounds pressure but this pressure is controlled manually only in this manner. Thus in the event that the engineman opens the valve A to its fullest extent while the reverse lever is all the way down to the right, as viewed in Figure 3, that is, giving the engine valves the maximum stroke, the pressure will build up rapidly in the cylinders, pipe 38 against piston 29 and as the resistance of the spring 40 is weakened, the piston will rise, permit air to escape from the pipe 20 and permit the throttle to close under the action of the spring 17 until a balance is reached, that is, a point at which the pressure sufficient to move the locomotive in accordance with the load and speed and thereby preventing the engineman from manually, other than by manipulation of the reverse lever, sending 500 pounds pressure to the cylinders. The action of the piston 29 is substantially instantaneous and thus the possibility of blowing a cylinder head by admitting too much steam under 500 pounds pressure would be avoided. However, if the engineman does move the valve A to its maximum open position and the above operation does take place and then latches back on the reverse lever, then the spring 40 is gradually strengthened to a point where it will balance the piston 29, thereby moving the valve C to admit the necessary amount of air pressure to the piston 15 for rendering available the 500 pounds at earliest cut-off. Up to 200 pounds, the engineman can control the steam pressure by the valve A but beyond that point the only control that the engineman has to increments of steam pressure is by means of the reverse lever which he must latch back, otherwise the valve C will exhaust, and reduce the steam pressure down to 200 pounds steam pressure or below.

It will thus be seen that in starting and maintaining motion of a heavy train, the pressure is below 200 pounds per square inch, and as the speed increases, and the engineman latches back, the earlier cut-off, through the operations just described, renders available the higher steam pressure. However, the earlier cut-off reduces the volume of steam though this higher pressure steam may contain more heat units. Therefore, the increase in heat units used in higher pressure steam is more than offset by the permissible reduction in amount of steam consumed in keeping the train in motion.

It will thus be readily comprehended that at no time can the engineman accidentally or voluntarily introduce to and maintain in the cylinders fluid under pressures in excess of a pre-determined and fixed maximum permitted by the setting of the reverse lever, 48, on the one hand, and on the other hand the pressures admitted to the cylinders are at all times manually variable between zero and a predetermined point (say two hundred pounds per square inch) and thereafter or therebeyond automatically controlled between said pre-determined point and the maximum permitted by the boiler pressure and the resistance of the spring 40, according to the setting of the reverse lever 48.

It will be further appreciated that by the employment of systems embodying my present invention, and my methods of operating the same, I am enabled to gain all of the advantages of relatively low pressure engines without being subject to their limitations and at the same time I am enabled to gain the advantages of the use of high pressures without being subject to obvious disadvantages incident thereto.

It will be understood that the steam pressure employed for keeping the engine in motion will depend on the cut-off as set by the engineman for a given speed so determined by the load and the schedule to be maintained.

Figure 10:
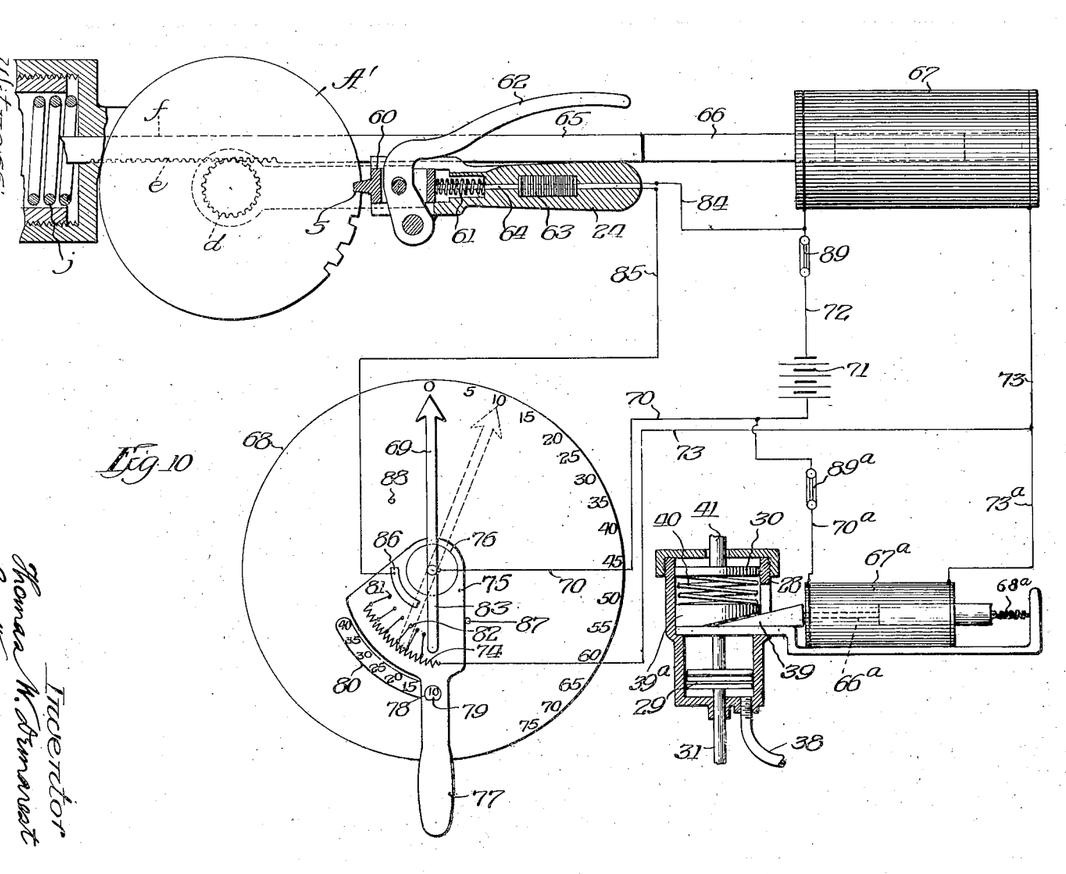
Figure 10 is a somewhat schematic view of an automatic constant speed control device.

Referring now to the adaptation of the engineman's valve shown in Figure 10, the valve is designated A' and is operated by the handle 24, said handle having a sliding latch block 60, a spring 61 for maintaining said latch block in one of the notches 8, and a latch lever 62 for manually withdrawing the latch when it is desired to manually operate the valve.

The handle 24 is arranged with a chamber containing a solenoid 63 provided with a movable core 64 which is fixedly connected to the latch block 60.

The plunger rod 65 corresponds to the plunger rod $f$ hereinbefore described, said plunger rod having an extending portion having fixedly attached thereto a core 66, which is arranged for reciprocation in the solenoid 67.

The arrangement shown in Figs. 10 and 11 is employed where it is desired to run the locomotive at a constant predetermined speed, and wherein variations of the setting of the speed may be accomplished readily, as desired by the engineman. Such an arrangement must also be characterized by the provision of mechanism which will not interfere with the manual operation of the throttle, in this instance the handle 24, when desired, or in emergency. To this end the structure shown has been designed.

The throttle handle 24, in this instance, has a predetermined relationship to a source of electrical energy, a solenoid 67, a speed indicator, and a manually operable rheostat for regulation purposes.

A speed indicator of any approved construction is shown at 68, located conveniently of access to the engineman, and is provided with a needle or finger member 69, which moves across the dial on which the indicia is placed for indicating the speed at which the locomotive is running. A flexible shaft $79a$ connects the speedometer to one of the controlling wheels $80a$ of the locomotive as shown in Figure 11. The needle 69 is connected by a conductor 70 to one side of a source of electrical energy 71 which is here shown as a battery but may be any other suitable source. The other side of the battery 71 is connected by a conductor 72 to one end of the solenoid winding 67 and the other end of the solenoid winding is connected by a conductor 73 to one end of a resistance unit 74.

The resistance unit 74 is carried on a plate 75 which is angularly displaceable upon the dial of the speed indicator by virtue of a bearing 76, said plate being provided with a handle 77 having an opening 78 with a pointer 79 therein. The pointer 79 is adapted to move across indicia 80 placed on the dial of the speed indicator and thus the resistance unit is bodily movable about the axis of movement of the finger 69.

The resistance unit is tapped to form a series of sections and each section is marked by a corresponding contact terminal, such as 81, on the plate 75. One of the terminal members on the plate 75 is designated 82, and serves a purpose which will presently appear. The indicator arm 69 is provided with an extension 83 of conducting material and this extension is adapted to move over and in contact with the terminals 81 and 82 when the speed indicator is actuated.

One side of the solenoid 63 is connected by a conductor 84 to the conductor 72 and the other side of said solenoid is connected by conductor 85 to an arcuate conducting strip 86 fixedly mounted on the plate 75. Limit stop pins 87 and 88 are provided on the dial of the speed indicator for limiting the movement of the plate 75. Under ordinary conditions of operation it is desirable that the whole automatic apparatus be capable of disconnection or at least capable of being rendered inoperable, and to this end a switch 89 is interposed in the conductor 72.

The device, in so far as the structure is concerned is entirely operative, but where the valve A' is employed in an installation such as that shown in Figure 3, and wherein are employed the variable pressure operated devices C and D, it is desirable that some suitable coordinating means be supplied whereby the tension of the spring 40 of the element D may be controlled to compensate for automatically produced variations in the position of the throttle handle 24.

To this end I provide a third solenoid $67a$ which may be supported on an extension of the plate 39, and connected in multiple with the solenoid 67, by the provision of conductors $70a$ and $73a$, a suitable switch $89a$ being interposed in one of said conductors. The solenoid $67a$ serves the purpose of varying the tension to which the spring 40 is subjected and accomplishes such variation by the provision of a wedge plate $67b$ fixedly connected to the core $66a$ of said solenoid. The wedge member enters the wall 28 of the casing containing the spring 40 and has its inclined surface in abutting engagement with the inclined surface of the vertically displaceable plate $39a$, which latter abuts one end of the spring 40. The bottom surface of the wedge $67b$ is in direct contact with the upper surface of the plate 39 and it will be observed that when the solenoid $67a$ is energized the wedge will be introduced to a predetermined degree against the tension of a helical spring $68a$ connected to the core $66a$.

It will be observed that when operating under the lower pressures, that is, between zero and say two hundred pounds per square inch, the spring 40 has the effect only of preventing the piston 29 from rising and venting the throttle operating device B. And no movement of the wedge 67b in response to energization of the solenoid changes this condition, because any movement of the wedge 67b which might take place would be inwardly and thus with the tendency to increase the strength of the spring 40.

Thus, in the operation of the automatic speed control as hereinafter more fully dwelt upon the solenoid 67a, while connected in multiple with the solenoid 67 does not in any appreciable manner affect the efficient operation of the speed control when operating on lower pressures, but the solenoid 67a does come into action when pressures are encountered above the predetermined maximum for which the device D is set, namely, steam pressure of say two hundred pounds per square inch referred to.

In the operation of this device assuming that the engineman desires to run the locomotive at a certain predetermined constant rate of speed, he moves the throttle 24b downwardly as viewed in Figure 10 and thus operates the piston 15 to start the locomotive. As the locomotive begins to move and get up to the desired speed the finger 69 moves around the dial and at the same time the extension 83 of said finger moves across the terminals 81. The engineer having previously determined that the speed is to be, say ten miles an hour, places the handle 77 so that the pointer 79 registers with the indicia indicating such speed, and when the extension 83 engages the terminal 82 sufficient resistance is interposed in series with the solenoid 67 to cause said solenoid to hold the throttle open to the point required to maintain that speed. Of course, the throttle lever 24 is not manually moved at this time.

As is customary in starting a steam locomotive, the reverse lever 48 may be moved, according to the desires of the engineman, and depending upon the inertia of the train to be overcome when starting, to a point either to the left or the right of the position shown in Figure 3; in other words, the engineman lengthens the stroke of the valves which control admission to the cylinders and thereby delays the cut-off and permits a greater volume of steam per stroke to enter the cylinders. Assuming that the lever 48 is moved to the right in Figure 3 the spring 40 will be weakened as hereinbefore explained, but due to the fact that this spring is set to restrain the piston 29 against any movement in response to pressures ranging from zero to a predetermined maximum, say two hundred pounds per the square inch, the piston 29 will remain stationary, and thus permit the required manipulation of the reverse lever when starting and getting up speed. However, as the locomotive increases its speed the lever 48 is "notched back", that is, the lever 48 is brought back toward the early cut-off position and the spring 40 again strengthened.

Assuming that the locomotive has reached the predetermined speed of ten miles an hour this speed will be maintained constant because in the event that the speed should decrease due to one of a number of factors, such as decreased steam pressure or the encountering of a grade, the speed indicator finger 69 will move to the left and thus cut out resistance and increase the degree of energization of the solenoid 67. This causes the solenoid to open the throttle to a greater degree and thus admit an additional increment of fluid under pressure to the cylinder 16, and thereby increase the speed, or at least return to or maintain it at the rate desired. The solenoid 63 is continuously energized while the locomotive is operating under the automatic speed regulation device by virtue of the supply of current thereto through the strip 86, and thus the latch block 60 is maintained disengaged from the notches shown.

Assuming that the locomotive is traveling at the rate of ten miles an hour and should increase its speed beyond the maximum desired the finger 69 will move past the terminal 82 and engage one of the terminals to the left of said terminal 82, thus interposing more resistance in series with the solenoid and permitting it to release the plunger 65 which is closed by the spring j hereinbefore described.

It will be obvious that the arrangement shown does not in any way interfere with manual operation of the handle 24, and if at any time the engineer desires to shut off, or to increase speed, he may do so manually regardless of the automatic control. Furthermore, he may increase the rate of speed as determined by the automatic control by merely shifting the handle 77.

When operating under the higher pressures the wedge 67b operates to compensate for variations in the tension of the spring 40, and in fact, the wedge being controlled in its position of the energization of the solenoid 67a, will act to regulate the tension of the spring 40, so that when the speed regulating solenoid 67 operates for controlling the speed when operating under higher pressures, that is, pressures beyond two hundred pounds to the square inch hereinbefore mentioned, the piston 29 will be so controlled as to permit the automatic admission of higher pressures to maintain the desired average rate of speed of the locomotive. In other words, when operating a locomotive equipped with this device with steam pressures over say two hundred pounds to the square inch, and in order to maintain a constant predetermined rate of speed, it is necessary that the regulating device D be controlled so that additional increments of steam may be admitted without venting the pipe 20 by the valve C. This, however, does not necessarily involve that the reverse lever does not function to control the point of such venting.

Of course, as previously set forth, the reverse lever position in effect, controls the increase in pressure possible in the dry-pipe or cylinders, that is, as the reverse lever is brought nearer the neutral position, or minimum cut-off position, so that the spring 40 is strengthened to increase the degree or maximum pressure at which the piston 29 will function to vent the pipe 20, close the throttle, and thereby reduce the pressure in the cylinders. Thus, when the lever 48 is moved nearly to the position shown in Figure 3, it will be possible to increase the pressure in the cylinders to considerably more than the pressure of say two hundred pounds to the square inch. But, as the control of speed of the locomotive must be automatic when operating under such high pressures (say more than two hundred and even to five hundred pounds per square inch) it is necessary that the solenoid 67a be provided for automatically strengthening or weakening the spring 40 regardless of the position of the reverse lever 48, so that increase, at least, in the cylinder pressure may be effected without actuating the piston 29.

Thus, when operating under high pressures, (e. g. above two hundred pounds to the square inch) assuming the reverse lever as set for such operation, the solenoid 67a will act to move the wedge inwardly upon a reduction in speed to permit of increase of throttle opening and pressure in the cylinders and to prevent movement of the piston 29, which movement would, of course, defeat the automatic control of speed. In the event of a failure of the circuits or failure of the automatic speed control to function, the spring 68a will remove the wedge, and permit automatic reduction in dry-pipe pressure by response of the piston 29 to such pressure.

By virtue of the provision of the switches 89, 89a, it will be appreciated that either of the solenoids 67, 67a may be operated separately, or that they may be operated together, according to the services contemplated.

Having thus described my invention, and illustrated its use, what I claim as new and desire to secure by Letters Patent is:

1. In a fluid pressure engine having a valve-gear and a throttle valve, actuating mechanism for said throttle valve comprising, in combination, a cylinder having a piston therein connected to the throttle valve, yielding means for operating the piston in one direction, and means for actuating said piston in the other direction, including connection to a source of fluid pressure for opening the throttle valve, an operating valve for establishing the flow of fluid against said piston, fluid flow controlling means between said operating valve and the actuating mechanism, regulating means for said controlling means, and an auxiliary connection between the actuating mechanism and the operating valve, independent of said controlling means and regulating means, for the relief of pressure against said piston, and to permit the closing of the throttle valve by said yielding means.

2. In a fluid pressure engine having a valve-gear and a throttle valve, actuating mechanism for said throttle valve, comprising, in combination, a cylinder having a piston therein connected to the throttle valve, yielding means for operating the piston in one direction, and means for actuating said piston in the other direction, including connection to a source of fluid pressure for moving the throttle valve, an operating valve for establishing the flow of fluid against said piston, fluid flow controlling means between said operating valve and the actuating mechanism, and means for regulating said flow controlling means said regulating means being in operative communication with the actuating fluid supplied to the engine.

3. In a fluid pressure engine having a valve-gear and a throttle valve, actuating mechanism for said throttle valve comprising, in combination, a cylinder having a piston therein connected to the throttle valve, yielding means for operating the piston in one direction, and means for actuating said piston in the other direction, including connection to a source of fluid pressure for opening the throttle valve, an operating valve for establishing the flow of fluid against said piston, fluid flow controlling means between said operating valve and the actuating mechanism, means for regulating said flow controlling means said regulating means being in operative communication with the actuating fluid supplied to the engine, and an auxiliary connection between the actuating mechanism and the operating valve, for the relief of pressure against said piston, and to permit the closing of the throttle valve by said yielding means.

4. In a fluid pressure engine having a valve-gear and a throttle valve, actuating mechanism for said throttle valve comprising, in combination, a cylinder having a piston therein connected to the throttle valve, yielding means for operating the piston in one direction, and means for actuating said piston including connection to a source of fluid pressure for moving the throttle valve, an operating valve for establishing the flow of fluid against said piston, fluid flow controlling means between said operating valve and said actuating mechanism, and means for regulating said controlling means including a cylinder having a piston device, a connection of said cylinder with the source of actuating fluid of the engine, means connecting said piston device to be responsive to variation in the cut-off of the valve-gear and through said connection being also responsive to the pressure of the actuating fluid supplied to the engine and said last mentioned means being operatively connected to said fluid flow controlling means.

5. In a fluid pressure engine having a valve-gear and a throttle valve, actuating mechanism for said throttle valve comprising, in combination, a cylinder having a piston therein connected to the throttle valve, yielding means for operating the piston in one direction, and means for actuating said piston in the other direction including connection to a source of fluid pressure for moving the throttle valve, an operating valve for establishing the flow of fluid against said piston, fluid flow controlling means between said operating valve and said actuating mechanism, and means for regulating said controlling means including a cylinder having a piston device a connection of said cylinder with the source of actuating fluid of the engine, means connecting said piston device to be responsive to variation in the cut-off of the valve gear and through said connection being also responsive in the pressure of the actuating fluid of the engine and operatively connected to said fluid flow controlling means, and an auxiliary connection between cylinder of the actuating mechanism and the operating valve for the relief of pressure against the throttle valve actuating piston, to permit said throttle valve to be closed by said yielding means.

6. In a fluid pressure engine having a valve-gear and setting means therefor and a throttle valve, actuating mechanism for said throttle valve comprising, in combination, a cylinder having a piston therein connected to the throttle valve, yielding means for operating the piston in one direction, and means for actuating said piston in the other direction including connection to a source of fluid pressure for moving the throttle valve, an operating valve for establishing the flow of fluid against said piston; fluid flow controlling means between said operating valve and said actuating mechanism, and means for regulating said controlling means including a cylinder, a thrust plate on the piston in said cylinder, a yielding resistance between said plate and piston, an operative connection between said thrust plate and the setting means of the valve-gear, an operative connection between said piston and the fluid flow controlling means and a connection between said cylinder and the source of actuating fluid supplied to the engine, said last mentioned piston being subjected on a face opposing said resistance to the pressure of said actuating fluid.

7. In a fluid pressure engine having a valve-gear and setting means therefor and a throttle valve, actuating mechanism for said throttle valve comprising, in combination, a cylinder having a piston therein connected to the throttle valve, yielding means for operating the piston in one direction, and means for actuating said piston in the other direction including connection to a source of fluid pressure for moving the throttle valve, an operating valve for establishing the flow of fluid against said piston, fluid flow controlling means between said operating valve and said actuating mechanism, and means for regulating said controlling means including a cylinder, a thrust plate and a piston in said cylinder, a yielding resistance between said plate and piston, an operative connection between said plate and the setting means of the valve-gear; an operative connection between said piston and the fluid flow controlling means and a connection between said cylinder and the source of actuating fluid supplied to the engine, said last mentioned piston being subjected on one face to the pressure of said yielding resistance and on the other face to the pressure of said actuating fluid of the engine, and an auxiliary connection between the actuating mechanism and the operating valve independent of said controlling valve and regulating means, for the relief of pressure against the throttle valve actuating piston, and to permit the closing of the throttle valve by said yielding means.

8. In a fluid pressure engine having a valve-gear and a throttle valve, actuating mechanism for said throttle valve comprising, in combination, a cylinder having a piston therein connected to the throttle valve, yielding means for operating the piston in one direction, and means for actuating said piston in the other direction including connection to a source of fluid pressure for opening the throttle valve, an operating valve for establishing the flow of fluid against said piston, a controlling valve having communication with said operating valve and said actuating mechanism and having an exhaust port, and means for regulating said controlling valve including a cylinder, a thrust plate and a piston in said cylinder, a yielding resistance between said plate and piston, an operative connection between said plate and the valve motion, an operative connection between the piston and the controlling valve, and a connection between said cylinder and the source of actuating fluid supplied to the engine, said last mentioned piston being subjected on one face to the pressure of said yielding resistance, and on the other face to the pressure of said actuating fluid of the engine, all so arranged that when the pressure of said actuating fluid admitted against said last mentioned piston does not exceed the resistance of said yieldingly resistant device said piston is moved to close the exhaust port, but when the pressure of said actuating fluid admitted against said last mentioned piston exceeds the resistance of said yieldingly resistant device said piston is moved to open said exhaust port, the pressure against the throttle valve actuating piston is relieved, and the throttle valve is moved toward closing position by said yielding means.

9. In a fluid pressure engine having a valve-gear and operating means therefor and a throttle valve, actuating mechanism for said throttle valve comprising, in combination, a cylinder having a piston therein connected to the throttle valve, yielding means for operating the piston in one direction, and means for actuating said piston in the other direction including connection to a source of fluid pressure for opening the throttle valve, an operating valve for establishing the flow of fluid against said piston, a controlling valve having communication with said operating valve and said actuating mechanism and having an exhaust port, and means for regulating said controlling valve including a cylinder, a thrust plate and a piston in said cylinder, a yielding resistance between said plate and piston, an operative connection between said plate and a part of the operating means of the valve motion, an operative connection between the piston and the controlling valve, and a connection between said cylinder and the source of actuating fluid supplied to the engine, said last mentioned piston being subjected on one face to the pressure of said yielding resistance and on the other face to the pressure of said actuating fluid of the engine, all so arranged that when the pressure of said actuating fluid admitted against said last mentioned piston does not exceed the resistance of said yieldingly resistant device said piston is moved to close the exhaust port, but when the pressure of said actuating fluid admitted against said last mentioned piston exceeds the resistance of said yieldingly resistant device said piston is moved to open said exhaust port, the pressure against the throttle valve actuating piston is relieved, and the throttle valve is moved toward closing position and an auxiliary connection between the actuating mechanism and the operating valve for the relief of pressure against the throttle valve actuating piston and the closing of the throttle valve by said yielding means.

10. In a fluid pressure engine having a valve-gear and operating means therefor and a throttle valve, actuating mechanism for said throttle valve comprising, in combination, a cylinder having a piston therein connected to the throttle valve, yielding means for operating the piston in one direction, and means for actuating said piston in the other direction including connection to a source of fluid pressure for opening the throttle valve in one direction, and a yielding resistance for moving the throttle valve in the opposite direction, an operating valve for establishing the flow of fluid against said piston, a controlling valve having communication with said operating valve and said actuating mechanism and an exhaust port, and means for regulating said controlling valve including a cylinder, a thrust plate and a piston in said cylinder, a yielding resistance between said plate and piston, an operative connection between said plate and the operating means of the valve motion, an operative connection between the piston and the controlling valve, and a connection between said cylinder and the source of actuating fluid supplied to the engine, said last mentioned piston being subjected on one face to the pressure of said yielding resistance and on the other face to the pressure of said actuating fluid of the engine, all so arranged that when the pressure of said actuating fluid under pressure admitted against said last mentioned piston does not exceed the resistance of said yieldingly resistant device said piston is moved to close said exhaust port, but when the pressure of said actuating fluid under pressure admitted against said last mentioned piston exceeds the resistance of said yieldingly resistant device said piston is moved to open said exhaust port, the fluid pressure against the throttle valve actuating piston is relieved, and the throttle valve is moved toward closing position by said yielding means.

11. In a fluid pressure engine having a valve-gear and operating means therefor and a throttle valve, actuating mechanism for said throttle valve comprising, in combination, a cylinder having a piston therein connected to the throttle valve, yielding means for operating the piston in one direction, and means for actuating said piston in the other direction including connection to a source of fluid pressure for opening the throttle valve in one direction, and a yielding resistance for moving the throttle valve in the opposite direction, an operating valve for establishing the flow of fluid against said piston, a controlling valve having communication with said operating valve and said actuating mechanism and an exhaust port, and means for regulating said controlling valve including a cylinder, a thrust plate and a piston in said cylinder, a yielding resistance between said plate and piston, an operative connection between said plate and the valve motion, an operative connection between the piston and the controlling valve, and a connection between said cylinder and the source of actuating fluid supplied to the engine, said last mentioned piston being subjected on one face to the pressure of said yielding resistance and on the other face to the pressure of said actuating fluid of the engine, all so arranged that when the pressure of said actuating fluid under pressure admitted against said last mentioned piston does not exceed the resistance of said yieldingly resistant device said piston is moved to close said exhaust port, but when the pressure of said actuating fluid under pressure admitted against said last mentioned piston exceeds the resistance of said yieldingly resistant device said piston is moved to open said exhaust port, the pressure against the throttle valve actuating piston is relieved, and the throttle valve is automatically moved toward closing position by said yielding resistance, and an auxiliary connection between the actuating mechanism and the operating valve for the relief of pressure against the throttle valve actuating piston, and for closing of the throttle valve.

12. In a fluid pressure engine having a valve-gear and operating means therefor and a throttle valve, actuating mechanism for said throttle valve comprising, in combination, a cylinder having a piston therein connected to the throttle valve, yielding means for operating the piston in one direction, and means for actuating said piston in the other direction including connection to a source of fluid pressure for moving the throttle valve, an operating valve for establishing the flow of fluid against said piston, fluid flow controlling means between said operating valve and said actuating mechanism, and means for regulating said controlling means including a cylinder, a thrust plate and a piston in said cylinder, a yielding resistance between said plate and piston, an operative connection between said plate and the valve-gear, which includes a cam actuated by variation in the cut-off of the valve-motion, an operative connection between the piston and the fluid flow controlling means, and a connection between said cylinder and the source of actuating fluid supplied to the engine, said last mentioned piston being subjected on one face to the pressure of said yielding resistance and on the other face to the pressure of said actuating fluid of the engine.

13. The combination with a fluid pressure engine having a valve gear, and a throttle and means for manually adjusting the valve gear to desired positions of cut-off, of a fluid pressure operated means for controlling the operation of the throttle synchronously with manual adjustment of the valve gear, and manually controlled means for actuating the throttle independently of the adjustment of the valve gear.

14. In a fluid pressure engine adapted to operate in two stages of pressure having a throttle and a valve gear, means for manually actuating said throttle to regulate the fluid pressure in the engine in one pressure stage of operation, and means for automatically actuating said throttle in another pressure stage in accordance with manual adjustment of the valve gear subject to fluid pressure in the supply conduit to the engine.

15. In a fluid pressure engine having a valve gear reversing mechanism, and means for adjusting the latter, means for varying the pressure in fluid admitted to the engine, a connection rendering said latter means automatically subject to variations in the adjustment of the valve gear, said pressure varying means operating in two stages, including one in which the fluid is admitted manually and another in which the fluid pressure is controlled automatically, and proportionately to the change in the adjustment of said valve gear.

16. In combination with a fluid pressure engine having a valve gear and a throttle valve, of actuating mechanism for said throttle valve comprising, in combination, a cylinder having a piston therein connected to the throttle valve, yielding means for operating the piston in one direction, and means for actuating said piston in the other direction, said actuating means including a connection to a source of fluid pressure for opening the throttle valve, an operating valve controlling said connection for establishing the flow of fluid against said piston, and an auxiliary connection between said cylinder of said actuating mechanism and the operating valve independent of said first connection, and said auxiliary connection operating independently of said first connection for the relief of pressure against the piston for closing the throttle valve.

17. In a fluid pressure engine having a valve gear and a throttle valve, actuating mechanism for said throttle valve comprising, in combination, a cylinder having a piston therein connected to the throttle valve, yielding means for operating the piston in one direction, and means for actuating said piston in the other direction, said last mentioned means including connection to a source of fluid pressure for opening the throttle valve, an operating valve for establishing the flow of fluid under pressure against said piston, means connected to the valve gear and movable thereby so as to be responsive to variation in the cut-off of the valve gear for controlling such flow, and an auxiliary connection between the actuating mechanism and the operating valve independent of said last mentioned responsive means, said auxiliary connection serving for the relief of pressure against said piston independently of said first connection for closing the throttle valve.

18. In a fluid pressure engine having a valve gear and a throttle valve, actuating mechanism for said throttle valve comprising, in combination, a cylinder having a piston therein connected to the throttle valve, yielding means for operating the piston in one direction, and means for actuating said piston in the other direction, including connection to a source of fluid pressure for moving the piston and thereby said throttle valve, an operating valve for establishing the flow of fluid against said piston, fluid flow controlling means between said operating valve and the actuating mechanism, and means connected to said setting means and removable in response to variation in the cut-off of the valve gear, and said means having a connection so as to be responsive to pressure of the actuating fluid supplied to the engine for regulating said controlling means.

19. In a fluid pressure operated engine, having a throttle and a valve gear, fluid pressure operating means for the throttle, means for supplying fluid under pressure to said means for actuating said throttle, and means interposed between the fluid pressure operated means and said supplying means and connected so as to be responsive to the setting of the valve gear for controlling the flow of fluid to said throttle operating means.

20. In a fluid pressure operated engine, having a throttle and a valve gear, fluid pressure operating means for the throttle, means for supplying fluid under pressure to said means in measured increments for actuating said throttle, and means interposed between the fluid pressure operated means and said supplying means and connected so as to be responsive to the setting of the valve gear for controlling the flow of fluid to said throttle operating means.

21. In a fluid pressure operated engine having a throttle and a valve gear, fluid pressure operated means for actuating the throttle, manually operable means for supplying fluid in measured increments to said throttle actuating means, manually operable means for adjusting the valve gear, and means actuated in response to fluid pressure delivered to the engine and the adjustment of the valve gear for controlling the admission of such increments of fluid pressure to said throttle actuating means.

22. In a fluid pressure operated engine having a throttle and a valve gear, fluid pressure operated means for actuating the throttle, manually operable means for supplying fluid in measured increments to said throttle actuating means, manually operable means for adjusting the valve gear, and means for controlling supply of such increments of fluid pressure to the throttle actuating means in accordance with the setting of the valve gear and fluid pressure delivered to the engine cylinders.

23. In a fluid pressure operated engine having a throttle and a valve gear, fluid pressure operated means for actuating the throttle, manually operable means for supplying fluid in measured increments to said throttle actuating means, manually operable means for adjusting the valve gear, controlling means comprising a valve interposed between said means for supplying fluid in increments and the throttle actuating means, a cylinder having a piston connected to said valve, spring means acting on said piston means for varying the tension of such spring by adjustment of said valve gear, and a fluid connection between said cylinder and the engine cylinders.

24. In a fluid pressure operated engine having a throttle and a valve gear, fluid pressure operated means for actuating the throttle, manually operable means for supplying fluid in measured increments to said throttle actuating means, manually operable means for adjusting the valve gear, controlling means comprising a valve interposed between said means for supplying fluid in increments and the throttle actuating means, a cylinder having a piston connected to said valve, spring means acting on said piston means for varying the tension of such spring by adjustment of said valve gear, and a fluid connection between the supply conduit to the engine cylinders and said last mentioned cylinder for applying pressure to the piston therein counter to the force of said spring means.

25. In a fluid pressure operated engine, having a throttle and a valve gear, manual means for adjusting the valve gear, fluid pressure operated mechanism connected to the throttle, means for supplying fluid under pressure to said mechanism, and means operated by the fluid pressure in the supply conduit to the engine cylinder for controlling the pressure supplied to said fluid pressure throttle operating mechanism.

26. In a fluid pressure operated engine, having a throttle and a valve gear, manual means for adjusting the valve gear, a fluid pressure operated mechanism connected for actuating the throttle, manual means for supplying fluid under pressure to said mechanism, and means operated by the fluid pressure in the supply conduit to the engine cylinder for controlling the pressure supplied to said fluid pressure throttle operating mechanism, and means for connecting said last mentioned controlling means to be directly acted upon by the setting of the valve gear.

27. In combination with a steam engine having a throttle, a valve gear, and adjusting means for said valve gear, of fluid pressure operated means for actuating the throttle, means for manually supplying fluid under pressure to said fluid pressure throttle actuating means, fluid pressure responsive means including a valve acted upon thereby for controlling the fluid under pressure supplied to said actuating means, and means including a connection to said valve gear adjusting means for actuating said fluid pressure responsive means to cause it to control the flow of fluid under pressure supplied to said throttle actuating means in accordance with the adjustment of said valve gear.

28. In combination with a steam engine having a throttle, a valve gear, and adjusting means for said valve gear, of fluid pressure operated means for actuating the throttle, means for manually supplying fluid under pressure in increments to said fluid pressure throttle actuating means, fluid pressure responsive means including a valve acted upon thereby for controlling the fluid under pressure supplied to said actuating means, and means including a connection to said valve gear adjusting means for actuating said fluid pressure responsive means to move said valve to permit the flow of such increments of fluid pressure only upon a corresponding proper setting of said valve gear adjusting means.

29. In combination with a steam engine having cylinders, a throttle, a valve gear, and manually operable means for adjusting said valve gear, of a fluid pressure operated device for actuating the throttle, means for supplying fluid under pressure in increments to said fluid pressure operated device and to maintain the sum of such increments of pressure, a throttle controlling valve for such fluid pressure, and means connected to said valve gear adjusting means for varying the position of said controlling valve by said valve gear adjusting means.

30. In combination, with a steam engine having cylinders, a throttle, a valve gear, and manually operable means for adjusting said valve gear, of a fluid pressure operated device for actuating the throttle, means for supplying fluid under pressure in increments to said fluid pressure operated device and to maintain the sum of such increments of pressure, a throttle controlling valve for such fluid pressure, means responsive to steam pressure supplied to the cylinders, a connection for said means to said valve gear adjusting means and to said throttle controlling valve for actuating the latter in accordance with the setting of the valve gear and steam pressure in said cylinders.

31. The combination with a fluid pressure engine having a valve gear and a throttle, of means for maintaining the pressure in the engine constant for a given valve setting speed and load and which includes fluid pressure operated throttle actuating mechanism and a manual operating valve for controlling fluid pressure to said mechanism, and means actuated by the setting of the valve gear for varying the pressure applied to said throttle actuating mechanism, irrespective of said manual operating valve, for varying the dry pipe of the pressure in the engine in accordance with the load demands thereon.

32. In a fluid pressure operated engine having a throttle and a valve gear, fluid pressure operated means for actuating the throttle, manually operable means for supplying fluid in measured increments to said throttle actuating means, manually operable means for adjusting the valve gear, and means for controlling the admission of such increments of fluid pressure to said throttle actuating means, and a connection for said controlling means to said valve gear adjusting means and a connection to the fluid supply for the cylinders of the engine.

33. The combination of a fluid pressure engine having a valve gear, and means for applying pressure thereto in one stage, means for controlling the application of said pressure manually, and means for applying pressure to said engine in another stage including means for regulating the application of said pressure of the setting of said valve gear, and means for preventing manual variation of pressure supplied to the engine without a corresponding adjustment of the valve gear.

THOMAS W. DEMAREST.